US011002958B2

(12) United States Patent
Dow et al.

(10) Patent No.: US 11,002,958 B2
(45) Date of Patent: May 11, 2021

(54) DYNAMIC CONTROL OF PARALLAX BARRIER CONFIGURATION

(71) Applicant: International Business Machines Corporation, Armonk, NY (US)

(72) Inventors: Eli M. Dow, Wappingers Falls, NY (US); Thomas D. Fitzsimmons, Lancaster, PA (US); Charles J. Stocker, IV, Austin, TX (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

(21) Appl. No.: 15/685,331

(22) Filed: Aug. 24, 2017

(65) Prior Publication Data
US 2019/0064536 A1   Feb. 28, 2019

(51) Int. Cl.
*G02B 27/00* (2006.01)
*H04N 13/315* (2018.01)
*H04N 13/368* (2018.01)
*H04N 13/398* (2018.01)
*H04N 13/31* (2018.01)
*G02B 30/27* (2020.01)
*G02B 27/01* (2006.01)

(52) U.S. Cl.
CPC ......... *G02B 27/0093* (2013.01); *G02B 30/27* (2020.01); *H04N 13/31* (2018.05); *H04N 13/315* (2018.05); *H04N 13/368* (2018.05); *H04N 13/398* (2018.05); *G02B 2027/0129* (2013.01)

(58) Field of Classification Search
CPC ............ G02B 27/2214; G02B 27/0093; G02B 2027/0129; G02B 27/225
See application file for complete search history.

(56) References Cited

U.S. PATENT DOCUMENTS

| 2008/0143895 | A1  | 6/2008  | Peterka et al. |
| 2010/0060983 | A1  | 3/2010  | Wu et al. |
| 2011/0080566 | A1  | 4/2011  | Lin |
| 2014/0313298 | A1  | 10/2014 | Usukura et al. |
| 2015/0029317 | A1  | 1/2015  | Kim et al. |
| 2015/0138327 | A1  | 5/2015  | Xu |
| 2015/0234455 | A1* | 8/2015  | LaValle ................ G02B 27/017 345/8 |
| 2015/0334379 | A1* | 11/2015 | Du ....................... H04N 13/315 348/51 |
| 2017/0054970 | A1* | 2/2017  | Singh ..................... B60K 35/00 |
| 2017/0257622 | A1* | 9/2017  | Seifert ............... G02B 27/2214 |

\* cited by examiner

*Primary Examiner* — Darryl J Collins
*Assistant Examiner* — Journey F Sumlar
(74) *Attorney, Agent, or Firm* — Cantor Colburn LLP; Steven Chiu

(57) ABSTRACT

A system and method to dynamically control a configuration of parallax barriers includes performing skeletal tracking, using a skeletal tracking system, to determine a position of each viewer of content displayed by an image source. One of the parallax barriers among the parallax barriers is determined as being most closely associated with a viewing angle of each viewer, and the one of the parallax barriers is adjusted as needed to display the content as a three-dimensional image to one or more of the viewers with the viewing angle that is the most closely associated.

20 Claims, 3 Drawing Sheets

DYNAMIC CONTROL OF PARALLAX BARRIER CONFIGURATION

BACKGROUND

The present invention relates to generating a three-dimensional (3D) image, and more specifically, to dynamic control of parallax barrier configuration.

A parallax barrier is a device that can be placed in front of an image source, such as a liquid crystal display (LCD), to generate a stereoscopic or multiscopic image without the need for the viewer to wear 3D glasses. The parallax barrier includes a layer of material with a series of slits that allow each eye to see a different set of pixels, thereby creating a sense of depth. The viewer must be positioned at a particular viewing angle relative to the parallax barrier to experience the 3D effect. Thus, the application of parallax barriers to providing 3D television is complicated because, unlike in a movie theater, for example, viewer positions are not pre-defined.

SUMMARY

According to an embodiment of the present invention, a method of dynamically controlling a configuration of parallax barriers includes performing skeletal tracking, using a skeletal tracking system, to determine a position of each viewer of content displayed by an image source, and determining one of the parallax barriers among the parallax barriers as being most closely associated with a viewing angle of each viewer. The method also includes adjusting the one of the parallax barriers as needed to display the content as a three-dimensional image to one or more of the viewers with the viewing angle that is the most closely associated.

According to another embodiment of the present invention, a system to dynamically control a configuration of parallax barriers includes a skeletal tracking system to determine a position of each viewer detected by the skeletal tracking system, and parallax barriers to display content as a three-dimensional image to each viewer with a viewing angle associated with one of the parallax barriers. A controller provides a control signal to each of the parallax barriers and to adjust one or more of the parallax barriers based on the position provided by the skeletal tracking system.

According to yet another embodiment of the present invention, a controller to dynamically control a configuration of parallax barriers includes a memory device configured to buffer content. A processor obtains a position of each viewer detected by a skeletal tracking system and to provide a control signal to respective one or more of the parallax barriers to adjust the one or more of the parallax barriers based on the position and associated viewing angle of each viewer.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As previously noted, a parallax barrier facilitates obtaining a 3D image from a two-dimensional image source such as an LCD television. However, the viewing angle relative to the parallax barrier at which the 3D effect can be experienced is limited. This can be more or less of an issue based on the content or environment in which content is being viewed. For example, when viewers 120 are in a theater room with defined seating options, the viewing angles from which content will be viewed may be well-defined. In other environments (e.g., den, gallery, kitchen), viewers 120 may be standing and moving. Certain content (e.g., sporting events) may be associated with more movement by the viewers 120 than other content (e.g., movie).

A prior approach to addressing the viewing angle limitation involved using a parallax barrier with multiple pairs of images to cover a wider viewing angle. This increased viewing angle still does not cover every potential position of a viewer. Another approach involved determining the position of an observer based on tracking the position of their eyes and controlling the direction of the parallax images accordingly. This approach is likely ineffective in the dark, which can be one, or even the preferred, viewing environment. Embodiments of the systems and methods detailed herein relate to the dynamic control of the configuration of multiple parallax barriers. Specifically, skeletal tracking is used to determine the position of each viewer. A robust controller applies a set of rules to dynamically control the configuration of a number of parallax barriers according to the viewer positions.

Figure 1:
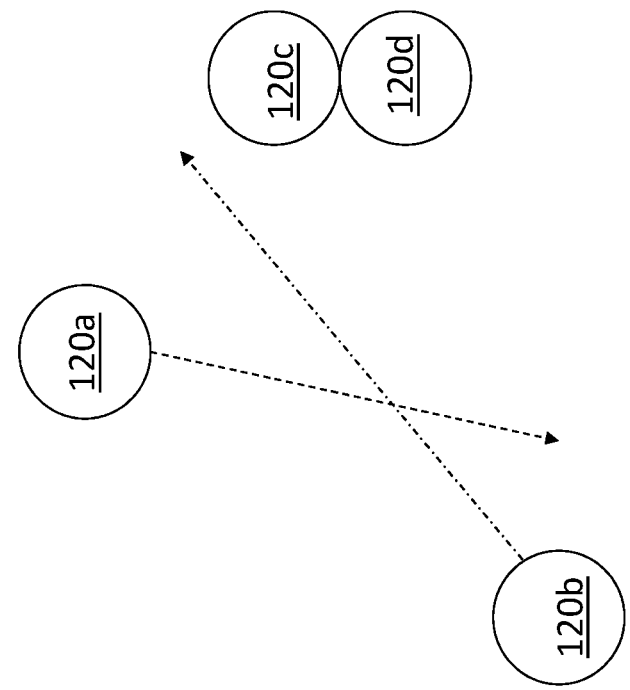
FIG. 1 is a block diagram of a system to perform dynamic control of parallax barrier configuration according to one or more embodiments.
Figure 1:
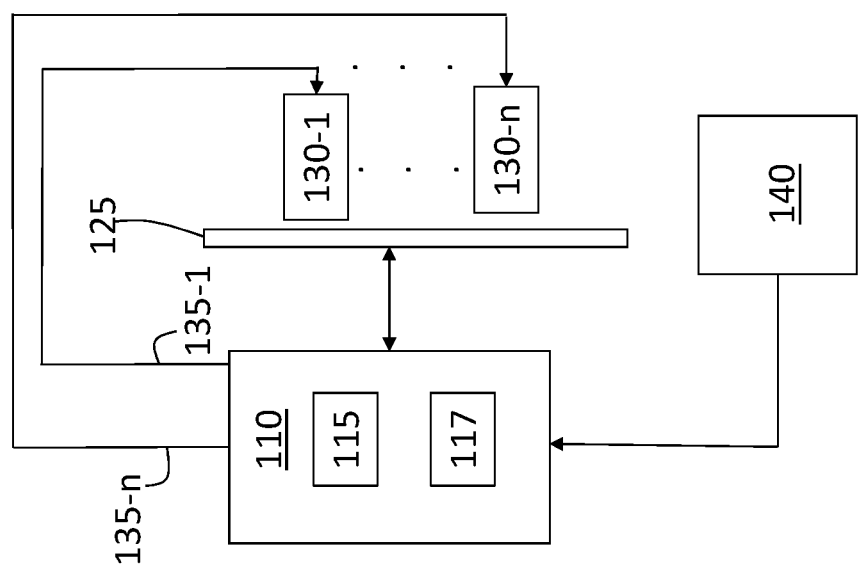

FIG. 1 is a block diagram of a system to perform dynamic control of parallax barrier 130 configuration according to one or more embodiments. The image source 125 can be an LCD television, for example. A number of parallax barriers 130-1 through 130-*n* (generally referred to as 130) are coupled to the image source 125 and are controlled by controller 110. A skeletal tracking system 140 tracks viewers 120*a*, 120*b*, 120*c*, 120*d* (generally referred to as 120) of the image source 125 and provides information to the controller 110. The exemplary movement paths shown for viewers 120*a*, 120*b* are discussed with reference to FIG. 2.

The skeletal tracking system 140 is known and is not detailed beyond a general description of an exemplary embodiment herein. The skeletal tracking system 140 includes a light detection and ranging (lidar) device. Generally, a pattern of pulsed light (e.g., infrared light) is transmitted. The distortion of that pattern in the resulting reflections, which result from the light encountering a reflective object (e.g., person), is determined with an image processor and used to infer depth information. A depth camera analyzes the reflected pattern to build a three-dimensional map of the environment (e.g., room), and the objects and people in the environment. When a scene is viewed from a different angle than the initial view, objects closer to the camera viewpoint are shifted or distorted more than objects farther from the camera. Thus, by analyzing a pattern shift by projecting the pattern of light from one location and observing reflections from another location, the shift may be detected and used to estimate the depth of objects in the scene. Classifiers that are trained on the point cloud may be applied to depth-mapped point clouds to match the captured scenes against reference motion capture skeletons. The skeletal tracking process is performed continuously while the image source 125 is turned on or while a 3D mode is selected for the image source 125.

The parallax barriers 130 are known and are only generally described herein. According to one embodiment, slits formed in each parallax barrier 130 allow the viewer to see only one set of pixels from the position of the left eye and another set of pixels from the position of the right eye. The pixels viewed by each of the eyes form a stereoscopic display together. Each of the parallax barriers 130-1 through 130-*n* is controlled by a corresponding control signal 135-1 through 135-*n* (generally referred to as 135) to change the direction of the image. The control signal 135 may result in a mechanical action such as sliding the shutter using a linear actuator such that the location of the slits is shifted to change the viewing angle associated with the parallax barrier 130. According to an alternate embodiment, the parallax barriers 130 may be assembled using a stacked LCD approach as discussed with reference to FIG. 2.

Figure 2:
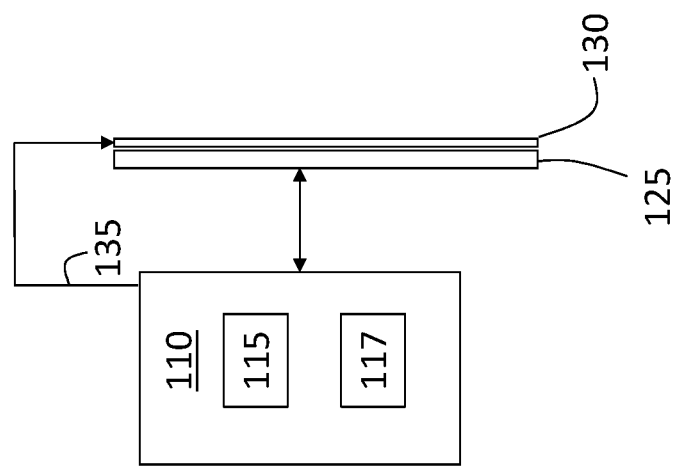
FIG. 2 is a block diagram of aspects of the system to perform dynamic control of parallax barrier configuration according to one or more embodiments.

FIG. 2 is a block diagram of aspects of the system to perform dynamic control of parallax barrier 130 configuration according to one or more embodiments. The image source 125 may be an LCD or LED panel that acts as a light source while a distinct LCD in front of the light source acts as the gate LCD or parallax barrier 130. The control signal 135 controls the gate LCD acting as the parallax barrier 130 to display black pixels at specific locations, thereby occluding the image from the image source 125 at those locations. By controlling the locations of the opaque pixels to interleave portions of the left-eye and right-eye images, a 3D view is generated. When multiple sets of opaque pixels are used to adjust the viewing angle for multiple viewers 120, the gate LCD can act as multiple parallax barriers 130, and the control signal 135 functions as corresponding multiple control signals 135 by adjusting the locations of the opaque pixels for viewing angles of each of the viewers 120.

The controller 110 includes known elements such as one or more processors 115 and one or more memory devices 117 to store instructions processed by the processor 115. The controller 110 receives input from the skeletal tracking system 140 regarding positions of each of the viewers 120. The controller 110 can also buffer the data that is being output by the image source 125. For example, if a movie is being viewed through the image source 125, the movie can be buffered in the memory device 117 of the controller 110. By analyzing the buffered content, the controller 110 can determine an upcoming scene during which to move one or more parallax barriers 130. For example, a set of frames in which most of the pixels are unchanged within a specified time period from the presently viewed frame may be determined as the time to move one or more parallax barriers 130 most inconspicuously.

According to an alternate embodiment, the controller 110 can additionally implement machine learning to predict the behavior of the viewers 120. A neural network can model viewer 120 movement to predict behavior (e.g., frequency of movement, path patterns). Learning viewer 120 behavior can augment control of the parallax barriers 130 by the controller 110. For example, if one viewer 120 is determined to be relatively active (i.e., moving from one viewing angle to another) in comparison to other viewers 120, the controller 110 may adjust the timing of moving a parallax barrier 130 for the movement of that viewer 120. That is, rather than waiting for the next inconspicuous scene within some time period, as discussed with reference to buffering a movie, for example, a parallax barrier 130 may be moved immediately after the active viewer 120 stops at a new location. The neural network may be trained using input data of body position over a plurality of previous locations, as derived from the skeletal tracking system 140, taken periodically in regular intervals, relative to the screen location or some other arbitrary ordinate point in space about the display. Training output may consist of nominal head position of the viewer 120 as anticipated at the next observation interval.

Figure 3:
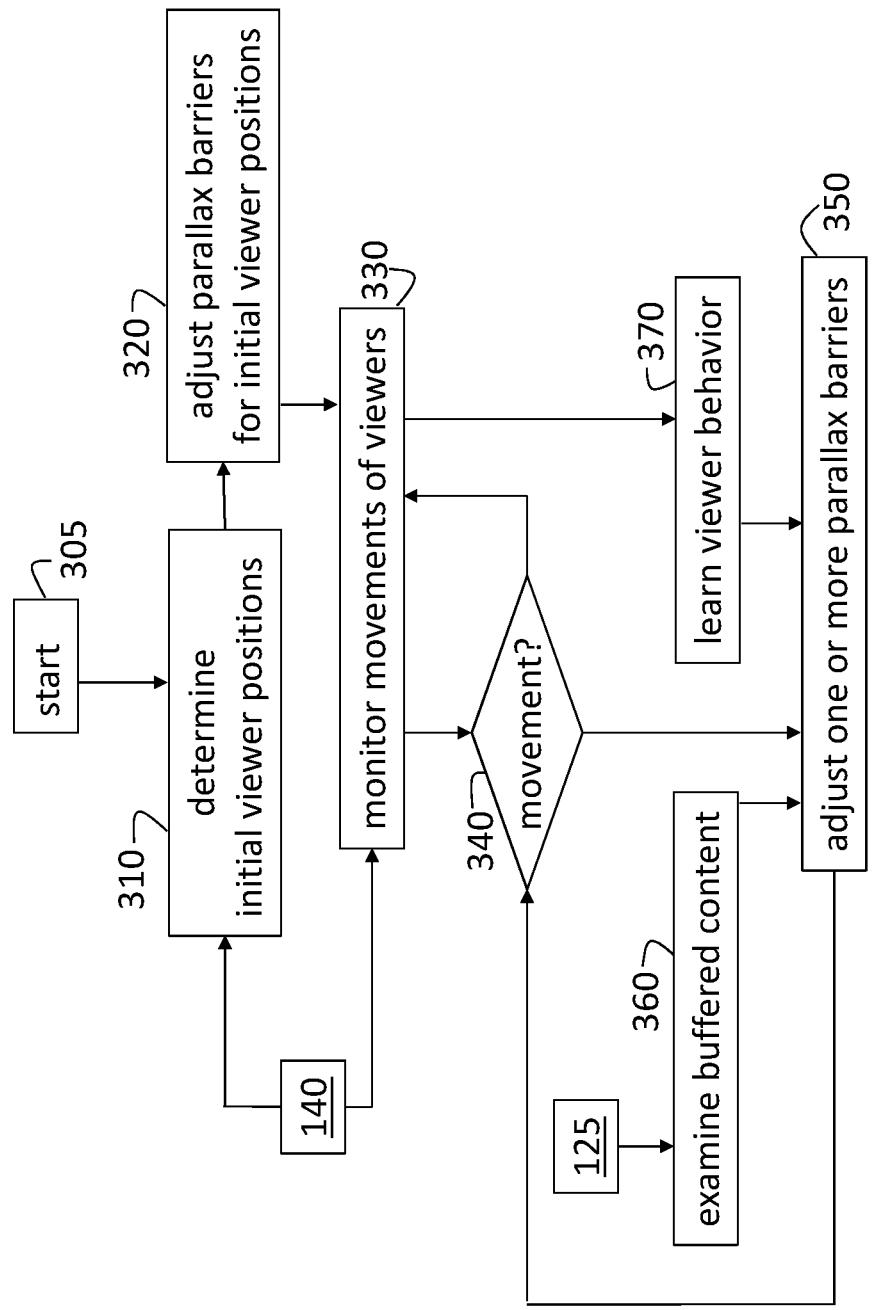
FIG. 3 is a process flow of a method of dynamically controlling the configuration of parallax barriers according to one or more embodiments.

FIG. 3 is a process flow of a method of dynamically controlling the configuration of parallax barriers 130 according to one or more embodiments. As discussed with reference to FIG. 1, the controller 110 obtains information from the skeletal tracking system 140 regarding the location of each viewer 120. The controller 110 can also obtain and buffer content from the image source 125. At block 305, the image source 125 is turned on or, alternately, a 3D viewing option for the image source 125 is turned on.

At block 310, determining initial viewer 120 positions includes determining how many viewers 120 are detected by the skeletal tracking system 140 and where they are positioned. Adjusting the parallax barriers 130 for the initial viewer 120 positions, at block 320, includes determining the parallax barrier 130 with the closest viewing angle to the position of each viewer 120 and adjusting the parallax barriers 130, as needed. When more than one viewer 120 is in the viewing angle associated with a single parallax barrier 130, additional parallax barriers 130 are not used in a one-to-one correspondence with viewers 120. For example, viewers 120*c* and 120*d* in FIG. 1 may share the same parallax barrier 130. This is because two or more parallax barriers 130 at the same or overlapping viewing angles can result in crosstalk and diminish the ultimate image that is visible to the viewers 120.

At block 330, monitoring movements of viewers 120 include obtaining information from the skeletal tracking system 140 periodically or based on an event (e.g., at least one viewer 120 moving). When the movement of at least one viewer 120 is determined, at block 340, adjusting one or more parallax barriers 130 may be performed, at block 350, if needed. As shown in FIG. 1 for viewers 120*a*, 120*b*, two viewers 120 can cross paths and essentially switch places from the perspective of the said of the room from which they are viewing content. In this case, the parallax barriers 130 previously assigned to each of the two viewers 120 may be switched so that the change in viewing angle that must be implemented for each of the parallax barriers 130 is minimized.

As previously noted, in alternate or additional embodiments, adjusting the one or more parallax barriers 130, at block 350, includes examining buffered content, at block 360, and learning viewer 120 behavior, at block 370. Examining buffered content, at block 360, includes receiving and buffering the content being viewed via the image source 125. This buffered content can be used to determine the most inconspicuous time to adjust the parallax barriers 130 at block 350. For example, the most inconspicuous time may be a heuristic function correlated to the expected future viewing location or the time to adjust a parallax barrier 130 to a new viewing angle or otherwise exchange parallax barriers 130 between viewers 120. The future viewing location and time may be learned with machine learning as previously described. The time for adjustment would also consider the duration of suitable buffered content for optimal parallax reassignment such as black frames or frames with low motion relative to surrounding frames. Learning viewer 120 behavior, at block 370, includes identifying individual viewers 120 based on the physical frames detected by the skeletal tracking system 140. The controller 110 implements a neural network architecture to model the movement (e.g., frequency of movement, path of movement) of each viewer 120 and learn movement behavior (e.g., frequency of movement, path patterns). As previously noted, the prediction can lead to a change in reaction time to a viewer 120 movement. For example, in response to a relatively active viewer 120 moving positions, the adjustment of one or more parallax barriers, at block 350, may be done more quickly than when a relatively less active viewer 120 changes positions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of dynamically controlling a configuration of parallax barriers, the method comprising:
    performing skeletal tracking, using a skeletal tracking system, to determine a position of each viewer of content displayed by an image source;
    determining one of the parallax barriers among the parallax barriers as being most closely associated with a viewing angle of each viewer;
    adjusting the one of the parallax barriers as needed based on mechanical action to move the one of the parallax barriers to display the content as a three-dimensional image to one or more of the viewers with the viewing angle that is the most closely associated with the one or more of the viewers.

2. The method according to claim 1, further comprising providing a control signal to adjust the one of the parallax barriers.

3. The method according to claim 1, wherein the determining the one of the parallax barriers includes determining a same parallax barrier for two or more of the viewers based on the viewing angle of the two or more of the viewers.

4. The method according to claim 1, wherein adjusting the one of the parallax barriers includes changing which of the viewers for which the adjusting is performed based on a new position of one or more of the viewers.

5. The method according to claim 1, further comprising learning movement behavior of the viewers.

6. The method according to claim 5, further comprising predicting a frequency of movement of the viewers based on the learning.

7. The method according to claim 6, further comprising modifying a frequency of the adjusting based on the frequency of movement predicted for the viewers.

8. The method according to claim 1, further comprising buffering the content to select frames of the content during which to perform the adjusting.

9. A system to dynamically control a configuration of parallax barriers, the system comprising:
    a skeletal tracking system configured to determine a position of each viewer detected by the skeletal tracking system;
    parallax barriers configured to display content as a three-dimensional image to each viewer with a viewing angle associated with one of the parallax barriers; and
    a controller configured to provide a control signal to each of the parallax barriers and to move, through mechanical action, one or more of the parallax barriers based on the position provided by the skeletal tracking system.

10. The system according to claim 9, wherein the controller is configured to provide a control signal to respectively adjust each of the one or more of the parallax barriers.

11. The system according to claim 9, wherein the controller is further configured to adjust one of the parallax barriers based on the position and the viewing angle of two or more of the viewers and disable another of the parallax barriers associated with the viewing angle of the two or more of the viewers.

12. The system according to claim 9, wherein the controller is further configured to adjust one of the parallax barriers for a different one of the viewers than one of the viewers for whom the one of the parallax barriers was adjusted based on a new position of the one of the viewers and the different one of the viewers.

13. The system according to claim 9, wherein the controller is further configured to learn movement behavior of the viewers.

14. The system according to claim 13, wherein the controller is further configured to predict a frequency of movement of the viewers based on learning the movement behavior.

15. The system according to claim 14, wherein the controller is further configured to modify a frequency at which the parallax barriers are adjusted based on the frequency of movement predicted for the viewers.

16. The system according to claim 9, wherein the controller is further configured to buffer the content and select frames of the content during which to perform adjustment of the parallax barriers.

17. A controller to dynamically control a configuration of parallax barriers, the controller comprising:
 a memory device configured to buffer content; and
 a processor configured to obtain a position of each viewer detected by a skeletal tracking system and to provide a control signal to respective one or more of the parallax barriers to move, through mechanical action, the one or more of the parallax barriers based on the position and associated viewing angle of each viewer.

18. The controller according to claim 17, wherein the processor is further configured to adjust one of the parallax barriers based on the position and the viewing angle of two or more of the viewers and disable another of the parallax barriers associated with the viewing angle of the two or more of the viewers.

19. The controller according to claim 17, wherein the processor is further configured to adjust one of the parallax barriers for a different one of the viewers than one of the viewers for whom the one of the parallax barriers was adjusted based on a new position and viewing angle of the one of the viewers and the different one of the viewers.

20. The controller according to claim 17, wherein the processor is further configured to select frames of the content during which to perform adjustment of the parallax barriers.

\* \* \* \* \*